Patented Aug. 5, 1952

2,606,191

UNITED STATES PATENT OFFICE 2,606,191

AMINO ETHYL ETHERS OF PICOLINYL CARBINOLS

Robert S. Shelton, Mariemont, and Charles H. Tilford, Silverton, Ohio, assignors to The Wm. S. Merrell Company, Cincinnati, Ohio, a corporation of Delaware No Drawing. Application April 30, 1948, Serial No. 24,428

4 Claims. (Cl. 260—296)

This invention relates to new products which are useful in combating, reducing or minimizing the physiological effects of histamine and other allergens, e. g., for the relief of hay-fever, asthma of allergenic origin, urticaria, and the like.

The new compounds of the invention are the α - phenyl - α - aminoethoxy 2 - methylpicolines, which may be represented by the formula

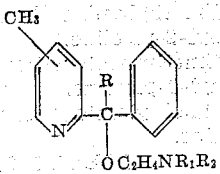

in which R, $R_1$ and $R_2$ represent hydrogen or an alkyl group having not more than three carbon atoms, and in which R, $R_1$ and $R_2$ may be alike or different, or in which $R_1$ and $R_2$ may be joined to form a cyclic structure, as where N, $R_1$ and $R_2$ form the piperidine radical. The new compounds are basic, and will ordinarily be used in the form of an acid addition salt, i. e., as the hydrochloride, hydrobromide, sulfate, succinate, phosphate, glycolate, acetate, tartrate, levulinate, or the like, by oral administration in the form of tablets or other suitable form. The hydrochlorides and hydrobromides are white, crystalline materials. The free bases are distillable under vacuum and may be converted to the salts by simple neutralization with the required amount of acid, while the acid addition salts may be converted to the free base by treatment with caustic or carbonated alkali in the usual way.

The new products are conveniently prepared by heating the corresponding phenyl-(2-picolyl)-carbinol with the corresponding amino-alkyl chloride or other salt in the presence of sodium, with purification of the free base product by distillation, or crystallization, or by conversion to a salt followed by crystallization. This will be illustrated by the following examples, but the invention is not limited thereto.

*Example I.*—A mixture of 54 g. of 30 mesh granular aluminum, 0.5 g. of mercuric chloride, and 5 drops of mercury was stirred in flask at about 125° for a few minutes. To this mixture there was then added 50 g. of γ-picoline and 50 g. of acetophenone. A vigorous reaction ensued when this mixture was refluxed. Then 600 g. of γ-picoline was added in one portion followed by the dropwise addition of 388 g. of acetophenone over a period of one hour with stirring and refluxing. The mixture was refluxed with stirring for an additional 12–18 hours. Most of the unreacted picoline then was removed by distillation, and the residue was taken up in about 500 ml. of toluene. To this with stirring was added 330 g. of potassium hydroxide in 500 ml. of water. The aqueous layer was discarded, and the toluene solution was extracted with an excess of 10% hydrochloric acid. The combined acid extracts were made alkaline with 20% potassium hydroxide, after which the precipitated oil was extracted with toluene and fractionally distilled. At 138–142° (0.1 mm.), 254 g. (58%) of carbinol was collected; M. P. 70–71° C. The hydrochloride melted at 185–187° C.

53.5 g. of the aforementioned carbinol was dissolved in 400 ml. of dry toluene. Sodium metal (6 g.) was added and the mixture was refluxed with vigorous stirring for about two hours. Then 35 g. of β-dimethylaminoethyl chloride in 400 ml. of dry toluene was added over a period of an hour, with refluxing continued for from 12 to 16 hours. The cooled reaction mixture was then washed with water and treated with 10% hydrochloric acid until the stirred mixture was acid to Congo red paper. Sufficient saturated sodium bicarbonate solution was then added to make the solution alkaline to Congo red. The operation resulted in most of the unchanged carbinol remaining in the toluene layer, and the amino-ether being extracted into the aqueous layer. The aqueous layer was separated, made alkaline with sodium carbonate, extracted with 400 ml. of petroleum ether, and the ether extract fractionally distilled. The α-(2-dimethylaminoethoxy)-α-methyl-α-phenyl-4-methyl-2-picoline was collected at 152–156° C. (0.1 mm.) and amounted to 36 g.

The monohydrochloride was prepared by dissolving the above aminoether in 50 ml. of ethanol and adding 10 ml. of a 46% alcoholic hydrochloric acid solution. About 3 volumes of dry ether were added; the mixture cooled and filtered. The solid hydrochloride having the formula:

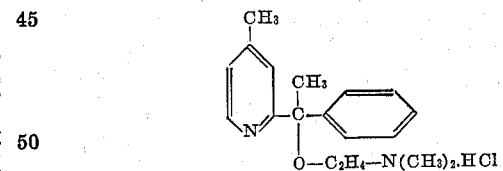

melted at 162–164° C., when recrystallized from an isopropanol-ethyl acetate mixture.

*Example II.*—The phenyl-methyl-2-(6-methylpyridyl)-carbinol having the structural formula:

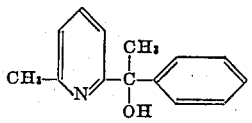

was prepared by the procedure similar to that of Example I, using 430 g. of α-picoline. The carbinol was collected at 134–136° (0.4 mm.), and its hydrochloride melted at 125–127° C. and was hygroscopic.

The aminoether having the formula:

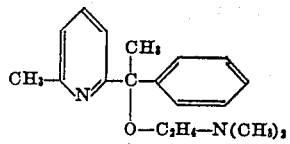

was prepared from 30 g. of the above carbinol by the etherification procedure described in Example I. The product was collected at 145–150° C. (0.3 mm.). Its monohydrochloride melted at 153–155° C.

*Example III.*—The phenyl-2-(4-methylpyridyl)-carbinol having the structure:

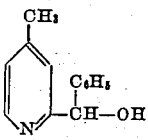

was prepared by a procedure similar to that of Example I, using benzaldehyde in place of acetophenone. The carbinol was collected during distillation at 136–140° C. (0.1 mm.).

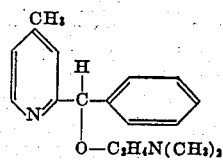

was prepared from this carbinol by the etherification procedure given in Example I. The base was collected at 145–147° (0.07 mm.) and its monohydrochloride melted at 188–190° C.

These compounds are highly effective as histamine antagonists, and are useful in the treatment of hay-fever, asthma, urticaria, and other ailments of the character associated with physiological reactions to histamine or the like, i. e., the so-called allergic responses or syndromes. Other compounds included in the invention and useful for the same purposes include:

α-(2'-diethylaminoethoxy)-α-methyl-α-phenyl-4-methyl-2-picoline;
α-(2'-methylpropylaminoethoxy) - α - phenyl-6-methyl-2-picoline;
α-(2'-dimethylaminoethoxy)-α-phenyl-α-ethyl-4-methyl-2-picoline;
α - (2' - aminoethoxy) - α - phenyl - α - propyl-6-methyl-2-picoline;
α-(2'-piperidinoethoxy)-α-phenyl-α-methyl-4-methyl-2-picoline.

We claim:
1. Compounds of the formula

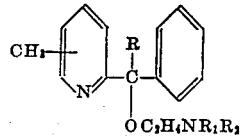

in which R is selected from the group consisting of hydrogen and alkyl groups with not more than 3 carbon atoms, and $R_1$ and $R_2$ are selected from the group consisting of hydrogen and alkyl groups with not more than 3 carbon atoms and alkylene groups so linked together as to form a piperidino structure.

2. α-(2' - dimethylaminoethoxy)-α-methyl-α-phenyl-4-methyl-2-picoline.

3. α - (2' - dimethylaminoethoxy)-α-methyl-α-phenyl-6-methyl-2-picoline.

4. α - (2' - dimethylaminoethoxy)-α-phenyl-4-methyl-2-picoline.

ROBERT S. SHELTON.
CHARLES H. TILFORD.

REFERENCES CITED

The following references are of record in the file of this patent:

UNITED STATES PATENTS

| Number | Name | Date |
|---|---|---|
| 2,397,799 | Martin et al. | Apr. 2, 1946 |

OTHER REFERENCES

J. Chem. Soc., 1939, 809–812.
Chemical Abstracts 35, 4771[3] (1941), citing Rec. Trav. Chim. 59, 971–977 (1940).
Hartman, California Medicine 66 (No. 4), 242–248 (1947).